United States Patent [19]

Kopp et al.

[11] 4,404,164
[45] Sep. 13, 1983

[54] NEUTRON FLUX PROFILE MONITOR FOR USE IN A FISSION REACTOR

[75] Inventors: Manfred K. Kopp, Oak Ridge; Kenneth H. Valentine, Lenoir City, both of Tenn.

[73] Assignee: The United States of America as represented by the U.S. Department of Energy, Washington, D.C.

[21] Appl. No.: 302,338

[22] Filed: Sep. 15, 1981

[51] Int. Cl.³ .............................................. G21C 17/00
[52] U.S. Cl. ...................................... 376/154; 376/255
[58] Field of Search ............... 376/153, 154, 254, 255; 250/390–392

[56] References Cited

U.S. PATENT DOCUMENTS

| 2,564,626 | 8/1951 | MacMahon et al. | 376/153 |
| 3,163,759 | 12/1964 | Cordy et al. | 376/154 |
| 3,666,950 | 5/1972 | Ferber et al. | 376/153 |
| 3,780,292 | 12/1973 | Klar | 376/255 |

FOREIGN PATENT DOCUMENTS 1263850  5/1961  France ................. 376/255

*Primary Examiner*—Sal Cangialosi
*Attorney, Agent, or Firm*—David E. Breeden; Stephen D. Hamel; Richard G. Besha

[57] ABSTRACT

A neutron flux monitor is provided which consists of a plurality of fission counters arranged as spaced-apart point detectors along a delay line. As a fission event occurs in any one of the counters, two delayed current pulses are generated at the output of the delay line. The time separation of the pulses identifies the counter in which the particular fission event occured. Neutron flux profiles of reactor cores can be more accurately measured as a result.

7 Claims, 1 Drawing Figure

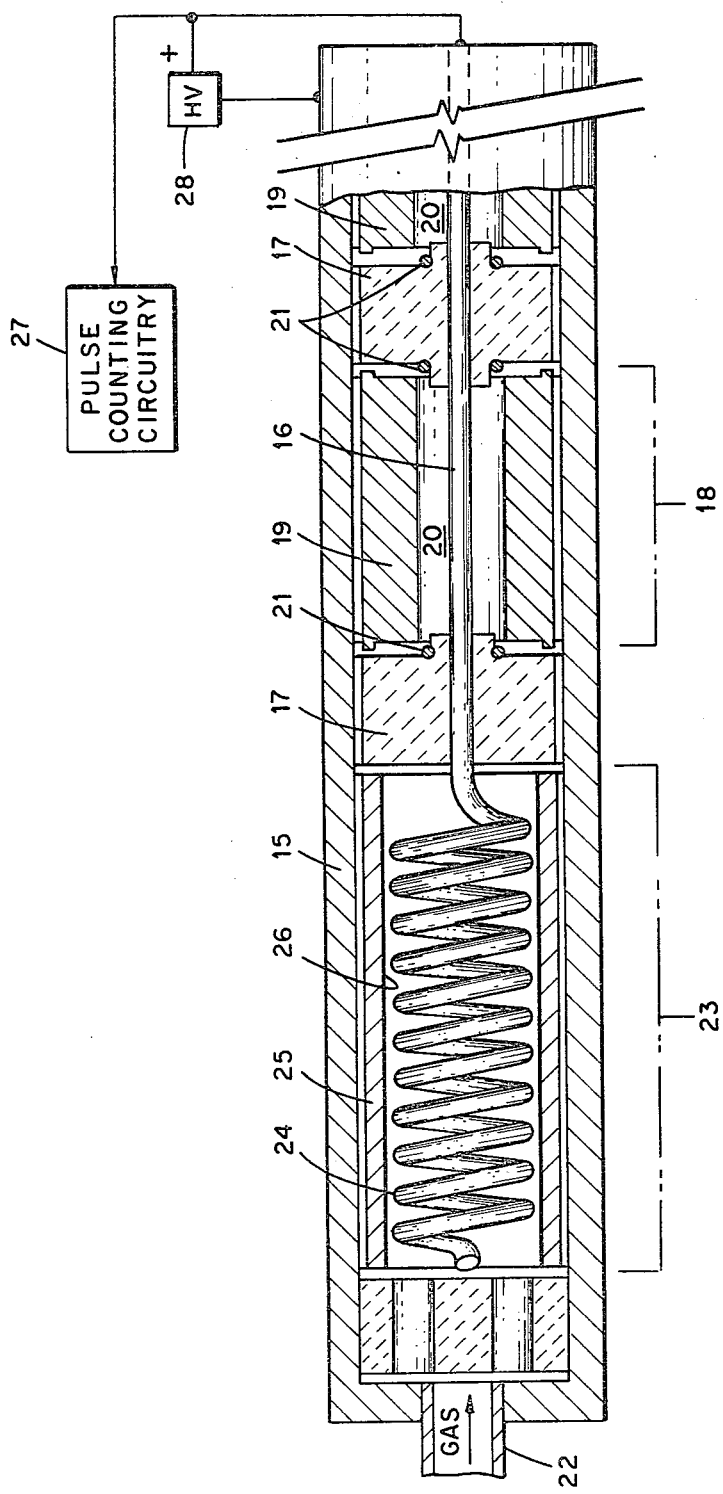

NEUTRON FLUX PROFILE MONITOR FOR USE IN A FISSION REACTOR

This invention is a result of a contract with the U.S. Department of Energy.

BACKGROUND OF THE INVENTION

This invention relates generally to fission counters and more particularly to fission counters for monitoring the neutron flux in a nuclear reactor core.

In nuclear reactor operation it is required to know the specific power at several locations throughout the reactor core. These measurements ensure that the local power does not exceed specified allowed values which could result in local fuel damage.

The primary way of determining local power is by inference from neutron flux data obtained from fission chambers operating in the DC current mode or from self-powered neutron detectors. These detectors are placed in a dozen or more instrument tubes that are located throughout the reactor core. Because each ionization chamber requires its own signal cable, only about 4 chambers can be fitted into an instrument tube. With a typical core length of approximately 3.6 meters, a detector spacing of almost one meter at each tube location is thus dictated. A smaller spacing is desirable for improved resolution of local power measurements in both power producing and experimental nuclear reactors.

SUMMARY OF THE INVENTION

It is, therefore, an object of this invention to provide a neutron flux profile monitor for use in a fission reactor core.

Further, it is an object of this invention to provide a neutron flux profile monitor which requires only one electrical lead to each core instrument tube to obtain the neutron flux density along the entire core at each tube location.

Additional objects, advantages, and novel features of the invention will be set forth in part, in the description which follows, and in part, will become apparent to those skilled in the art upon examination of the following or may be learned by practice of the invention. The objects and advantages of the invention may be realized and obtained by means of the instrumentalities and combinations particularly pointed out in the appended claims.

To achieve the foregoing and other objects and in accordance with the purpose of the present invention, as embodied and broadly described herein, the neutron flux profile monitor of this invention may comprise a tubular housing in which a plurality of spaced apart fission counters are disposed within and equally spaced along the axis of the housing formed about a common anode disposed along the axis of the housing. A dielectric material is disposed between each of the plurality of counters and about the common anode conductor to form a delay line. A source of high voltage is connected to one end of the anode and the other end of the anode is terminated by an LC terminating means so that a first component of a current pulse induced in the anode from a fission event in one of the counters and propagating toward the opposite end is reflected back along said anode to arrive at the instrument end of the anode at a time differing from the arrival of a second component of a current pulse propagating toward the instrument end of the anode.

Means are provided for detecting the time difference of arrival of the first and second current pulse components at the instrument end of the anode as an indication of the fission event location along the anode of the counter.

IN THE DRAWINGS

The single FIGURE is a partially sectioned view of a neutron flux profile monitor according to the present invention which illustrates the fission counter chambers mounted within a tubular housing which may be inserted into the instrument tube of the reactor core together with the LC termination of the anode and the pulse counting circuitry.

DETAILED DESCRIPTION

Referring to the FIGURE, an aluminum tube 15 for insertion in a fission reactor core instrument tube contains a central wire 16, which may also be of aluminum, separated by a dielectric material 17. The outer radius of the wire 16 in relation to the inner radius of the tube 15 provides a characteristic impedance of about 50 ohms. The wire and tube can thus function as a 50 ohm coax cable, i.e., a transmission line. Depending on the dielectric material used, the line will have a delay of about 3 nanoseconds per meter. The preferred dielectric material is $Al_2O_3$.

Small, low sensitivity fission counters 18 are built into the transmission line at spaced intervals along its length. At each fission counter location, the dielectric 17 is replaced by an aluminum cylinder 19 forming a cathode for the counter segment. The wire 16 acts as the anode and the gap between it and the cylinder 17 serves as an electron drift region 20 of the fission counter. The wire 16 thus forms a common anode for the plurality of counters equally spaced along the interior of the tube 15. The fissionable material for the counter is $^{235}U$ that has been coated onto two small stainless steel snap rings 21 that fit into grooves in the dielectric 17 adjacent the respective ends of the drift chamber 20 of each of the counter segments. The drift region 20 of each counter is filled with a counter gas by means of a fill tube 22 at one end of the tube 15.

An open-circuit distributed LC delay line 23 is built into the fill tube end of the tube 15. Here, the central wire 16 is wound into a 0.6 cm O.D. coil (24) about 6–7 cm long to form the distributed inductance. An aluminum sleeve 25 which has been anodized to produce a surface oxide coating 26 about 0.13 mm thick, acts as a distributed capacitance along with coil 24. The ratio of these reactances produces a characteristic impedance of approximately 50 ohms in order to match the impedance of the coaxial portion of the remainder of the anode 16 connected to the coil 24. The anode 16 is connected at the opposite end of the tube 15 to pulse counting circuitry 27 and the positive side of a high-voltage power supply 28.

In operation, when the flux monitor is placed in a neutron flux, such as an instrument tube in a nuclear reactor core, where the neutron flux may be $10^{12}$ to $10^{13}$ neutrons/cm$^2$/sec., the neutrons produce fission events in the $^{235}U$ coating of the rings 21. Only those fragments that leave the rings 21 substantially parallel to the axis of the cathode 19 of the particular counter in which the event has occured are detected. The othr fragments are absorbed in the dielectric material 17 surrounding the remaining portion of the ring 21. The ring-n-groove structure thus serves as a collimator to select only the near-cathode fission fragments which all have a fairly long track and deposit considerable energy in the form of ionization of the counter gas. The radial electric field is largest near the anode 16, which ensures that the electrons drift through this high field region induce more charge and produce larger current pulses in the anode.

Each fission event induces a current pulse having components propagating in both directions on the central anode 16. One component travels toward the pulse counting circuit end of the anode, and the other component travels in the opposite direction to the LC delay line 23 prior to being reflected back along the anode 16 toward the pulse counting circuit end. These pulses arrive at the pulse counting circuit at different times, the time interval being proportional to the spatial location along the axis of the tube at which the signal is generated, i.e., the particular counter location. Since each fission counter is only about 1 cm long, it acts essentially as a point detector of the neutron flux, and the pulse counting circuitry may include a conventional multichannel analyzer to independently sum the events from each counter as they are detected by the pulse counting circuitry. The time difference between the current pulse components following an event may be detected by a conventional interval digitizer.

In a preferred embodiment, the flux monitor extends the full axial length of the reactor core (about 3.8 meters) and has a delay time of 5 nanoseconds/meter. In this embodiment, the tube 15 is approximately 1-2 cm outside diameter to fit within a typical core instrument location. A preferred counter gas is a mixture of about 80% argon and 20% $CF_4$ at atmospheric pressure to provide a high electron drift velocity (1.25 times $10^7$ cm/sec). A very fast electron collection time of about 8 nanoseconds results from the high drift velocity and the narrow electrode gap of about 1 mm. The anode 16 is maintained at a potential of from 50 to 100 volts with respect to the cathode. Each cathode is in turn connected to the tube body 15 which is connected to the grounded side of the power supply 28. With pulses that begin and end in 20 to 40 nanoseconds, a 1-2 nanosecond time interval between the leading edges of the prompt and delayed pulses is easily detected. A spatial response of each counter is separately resolvable with near 100% peak-to-valley ratio.

The single most important feature of the invention is providing fission counters at short, approximately 15 cm, intervals in an instrument tube which results in much improved spatial neutron flux resolution. In addition, by going from ionization chambers operating in the current mode to fission counters counting individual pulses, the dynamic range of each counter may be raised from 3-6 orders of magnitude for broader coverage in the power range of the reactor. The use of fast pulses permits large total pulse rates before incurring pulse pile-up losses.

Individual fission counters may be recalibrated by a standard means of traveling-in-core-probe during a reactor power outage or during a core reloading operation. The flux monitor may have an alternate recalibration method. If $^{235}U$ is used as the fission fragment generator, its inherent alpha activity can be measured any time a significant neutron and/or gamma activity is not present. The change in alpha activity can be related to the remaining fissile content of the counter $^{235}U$ target material. If $^{235}U$ is alternated with $^{238}U$ in the fission counters, both the thermal and fast neutron distributions may be measured simultaneously. However, there would be a factor of two reduction in spatial resolution because only every other detector is used for thermal or fast neutrons. Such a device may be of value in development programs such as the breeder reactor, for example.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A neutron flux profile monitor for use in a fission reactor core comprising:
   a tubular housing;
   a plurality of spaced apart fission counters disposed within and equally spaced along the axis of said housing formed about a common anode disposed along the axis of said housing;
   a dielectric material disposed between each of said plurality of counters and about said common anode conductor thereby forming in combination with said anode a delay line;
   a high voltage source connected to one end of said anode;
   an LC terminating means for terminating the opposite end of said anode so that a first component of the current pulse induced in said anode from a fission event in one of said counters and propagating toward said opposite end thereof is reflected back along said anode to arrive at said one end of said anode at a time differing from the arrival of a second component of said current pulse propagating toward said one end of said anode; and
   means for detecting the time difference of arrival of said first and second current pulse components at said one end of said anode as an indication of the counter location of said fission event along said anode.

2. The monitor as set forth in claim 1 wherein each of said fission counters includes an electrically conductive sleeve coaxially disposed about said anode and forming a cathode of said counter and spaced from said anode to provide an electron drift region filled by said ionizable gas and a pair of fissionable material sources disposed at the opposite ends of said drift region so that fission fragments released by said sources when struck by a neutron producing a fission event are directed through said gas substantially parallel to said anode producing ionization within said gas in said drift region.

3. The monitor as set forth in claim 1 wherein each of said fissionable material sources comprises a ring of stainless steel material coated with said fissionable material and concentrically disposed about said anode, said ring having a diameter consistant with the diameter of said drift region and partially embedded in said dielectric material adjacent the counter ends to limit projection of said fission fragments to a direction substantially parallel to said anode.

4. The monitor as set forth in claim 3 wherein said fissionable material coating is substantially uranium-235.

5. The monitor as set forth in claim 3 wherein said fissionable material coating of said rings of said plurality of counters is alternately uranium-235 and uranium-238.

6. The monitor as set forth in claim 4 wherein said ionizable gas is a mixture of about 80% argon and about 20% $CF_4$ at atmospheric pressure.

7. The monitor as set forth in claim 1 wherein said LC terminating means comprises a coiled portion of said opposite of said anode conductor disposed concentrically within said housing, an electrically conductive sleeve disposed within said housing coaxially about and spaced from said coiled portion of said anode and an aluminum oxide coating disposed on the inside surface of said electrically conductive sleeve.

* * * * *